Figure 1:
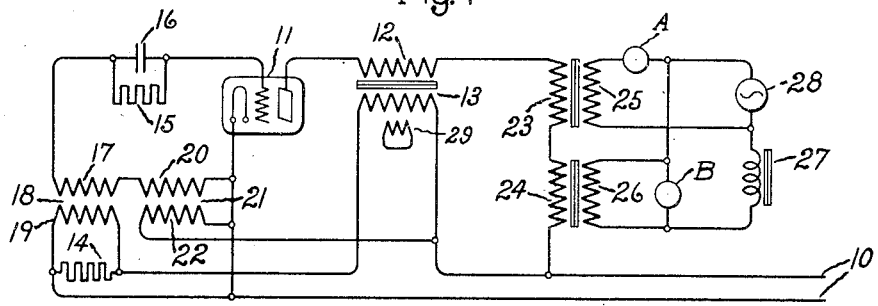

Aug. 29, 1933.  C. G. SUITS  1,925,011
LOW FREQUENCY OSCILLATOR
Filed Sept. 17, 1930

Inventor:
Chauncey G. Suits,
by Charles E. Tullar
His Attorney.

Patented Aug. 29, 1933

1,925,011

UNITED STATES PATENT OFFICE 1,925,011

LOW FREQUENCY OSCILLATOR

Chauncey G. Suits, Schenectady, N. Y., assignor to General Electric Company, a corporation of New York Application September 17, 1930
Serial No. 482,535

11 Claims. (Cl. 172—281)

My invention relates to electrical apparatus for generating low frequency periodic current and more particularly to such apparatus for generating low frequency intermittent unidirectional current.

Heretofore various arrangements have been proposed involving the use of grid controlled electric valves for generating alternating current or intermittent unidirectional current. With these prior arrangements, however, it has been found either impossible to generate periodic currents having a low frequency, or impractical to generate these low frequency currents because of the variability of the circuit elements upon which the frequency of the system depends.

It is an object of my invention to provide an electric circuit utilizing a controlled electric valve which will generate periodic current of a very low frequency, for example, such as several cycles per minute.

It is a further object of my invention to provide an electric circuit utilizing a controlled electric valve for generating a periodic current which shall be definite and invariable in frequency in spite of changes in surrounding conditions.

While my invention is of general application, it is particularly adapted for use in intermittently turning off and on electric lamps such as used in beacon lights, danger signals, traffic signals, etc. According to my invention I provide an electric circuit including an electric valve provided with a control grid, the saturating winding of a saturating reactor, and a source of current. Initially the grid of the electric valve is so biased as to render the valve conducting, so that current will flow through the saturating winding of the reactor. As this reactor becomes saturated, its decrease in impedance effects a change in the potential of the grid to render the valve nonconducting and thus interrupt the saturating current.

The decreased impedance of the saturated reactor is maintained until its magnetic field decays sufficiently, dissipating its energy in a short-circuited winding customarily provided with saturating reactors. This cycle is repeated indefinitely. The circuit to be controlled is associated with the anode circuit of the valve. The frequency of the unidirectional intermittent impulses which are delivered to this controlled circuit depend, among other things, upon the constants of the tube and the saturating time of the reactor. According to a modification of my invention, a device having either a positive or negative resistance-current characteristic, such as an incandescent lamp, is introduced into the main winding of the saturating reactor. This device introduces a new factor in determining the frequency of the periodic current generated by the apparatus.

Figure 2:
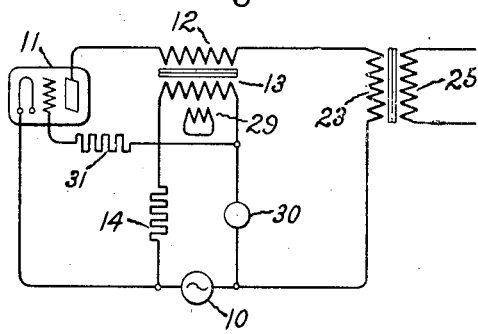

For a better understanding of my invention, together with other and further objects thereof, reference is had to the accompanying drawing and its scope will be pointed out in the appended claims. Fig. 1 of the drawing illustrates my invention as applied to a circuit for alternately turning off and on a pair of electric lamps, such as might be used in a traffic signal system, and Fig. 2 represents a modification of my invention in which a device having a positive resistance-current characteristic is one of the factors in determining the frequency of the periodic current delivered by the apparatus.

Referring to Fig. 1, I have illustrated an arrangement for alternately turning off and on the electric lamps A and B.

This arrangement includes a circuit for generating a source of low frequency periodic current comprising a source of current 10 and an electric valve 11 provided with a cathode, an anode, and a control grid and the saturating winding 12 of a reactor 13 provided with a small short-circuited winding 29. The electric valve 11 may be of any of the several types well known in the art but I prefer to use a vapor electric discharge valve. The main winding of the reactor 13 is connected across the source 10 through a resistor 14. The grid circuit of the electric valve 11 includes a high resistance grid leak 15, a condenser 16, the secondary winding 17 of a transformer 18, the primary winding 19 of which is connected across the resistor 14, and the secondary winding 20 of a transformer 21, the primary winding 22 of which is connected across the source 10. The load circuit of the low frequency generator includes the saturating windings 23 and 24 of reactors 25 and 26 respectively. The reactor 25 is connected in series with the lamp A and the reactor 26 is connected in parallel to the lamp B, the two lamp circuits being connected in parallel across a source of alternating current 28. The circuit of lamp B also includes a current limiting reactor 27 for the purposes explained hereinafter.

For the purposes of explanation assume that the circuit 10 has just been energized and that no current is as yet flowing in the anode circuit of the electric valve 11. The potential applied to the grid of the electric valve 11 through the transformer 21 is in phase with its anode potential so that a current tends to flow in the valve 11 whenever its anode potential is positive. As the current builds up in the valve 11 and in the saturating winding 12, the reactor 13 becomes saturated and its impedance greatly decreases allowing current to flow from the source 10 through the reactor 13 and the resistor 14. As current builds up in this circuit the potential across the resistor 14 builds up and is applied to the grid of the valve 11 through the transformer 18. This potential is opposite in phase to that supplied by the transformer 21 and is so proportioned that when the impedance of the reactor 13 is a minimum it will more than neutralize the potential supplied by the transformer 21 and will make the grid of the electric valve 11 negative when its anode potential is positive, thus interrupting the flow of current in the valve. When the current is interrupted in the saturating winding 12 of the reactor 13, the flux in this reactor dies down, its energy being dissipated in the winding 29, and its impedance again increases to its maximum value with a corresponding decrease in the potential applied to the grid of the valve 11 through the transformer 18. The potential applied to the grid of the valve 11 through the transformer 21 again predominates and renders the valve 11 conducting. The grid leak 15 and condenser 16 are provided to allow the negative potential impressed upon the grid 11, when the impedance of the reactor 13 is a minimum, to slowly leak off the grid. The resulting current flowing in the saturating winding 12 and in the output circuit 23 and 24 comprises a series of rectified half-waves flowing intermittently. The number of half-waves in each train and the interval between successive trains, that is, the frequency of the periodic current, being dependent among other things upon the following factors: the constants of the electric valve 11, the grid leak and condenser 15 and 16 and the time required to saturate the reactor 13. The most appropriate value of each of these factors may be easily selected and it has been found that periodic current of frequencies ranging from 10 cycles per second to one cycle per minute may be readily obtained. While I have shown a single electric valve 11 so that the output current constitutes a series of rectified half-waves it will be obvious to those skilled in the art that a pair of valves might be substituted in lieu thereof and thus obtain full wave rectification.

The illustrated embodiment of my invention utilizes the periodic current generating circuit to alternately turn off and on the lamps A and B. When the current flowing in the saturating windings 23 and 24 of reactors 25 and 26, respectively, is a maximum, the impedance of these reactors is a minimum and the current will flow from the source 28 through the lamp A, but the current will be shunted from the lamp B through the low impedance reactor 26 with the result that this lamp will not be illuminated. The reactor 27 is included in the circuit of the lamp B to limit the current through the reactor 26 when its impedance is very low. When the current is interrupted in the saturating windings 23 and 24, the impedance of the reactors 25 and 26 is a maximum, with the result that insufficient current will flow in the circuit of the lamp A to illuminate it while now current from the source 28 will flow through the lamp B. The reactor 27 also serves to equalize the potential applied to the lamp B with that applied to the lamp A through the reactor 25 when the impedance of the reactor is low, so that the lamps A and B will be illuminated alternately to equal intensities. However, this last described feature of alternately energizing a pair of electro-responsive devices by intermittently and simultaneously varying the impedance of impedance elements connected in series and in parallel with the electro-responsive devices, respectively, forms no part of my present invention but is disclosed and broadly claimed in my copending divisional application Serial No. 577,445, filed November 27, 1931, and assigned to the same assignee as the present application.

Fig. 2 represents a modification of my invention in which a device 30 having a positive resistance-current characteristic, such for example as a tungsten filament lamp, is included in the circuit of the reactor 15. In devices of this type, the change in resistance lags the change in current, and this time delay becomes one of the frequency determining factors of the circuit. The grid of the valve 11 is connected to the reactor circuit at a point intermediate the reactor 13 and the device 30 through a current limiting resistor 31. For certain types of electric valves it may be desirable to include a negative bias battery in the grid circuit, as is well understood by those skilled in the art. With this arrangement, the initial impedance of the saturating reactor 13 is very high so that a very small current will flow in the reactor circuit including the device 30. For very small currents, the resistance of the device 30 is very low so that the potential applied to the grid of electric valve 11 is approximately the same as the anode potential and the valve 11 becomes conducting. Current now flows from the source 10 through the electric valve 11, the saturating winding 12 of the reactor 13, and the saturating winding 23 of the reactor 25, which constitutes the output circuit. As the current builds up in the saturating winding the impedance of the reactor 13 decreases to its minimum value, the current builds up in the main reactor circuit and the resistance of the device 30 rapidly increases. With this condition, practically the whole potential drop in the reactor circuit is across the device 30 with the result that the potential applied to the grid of the valve 11 approaches the cathode potential of the valve and it is rendered non-conducting, thus interrupting the flow of current in the saturating winding 12. This cycle is, of course, repeated indefinitely. It will be obvious to those skilled in the art that the device 30 may have a negative resistance current characteristic, such for example as a carbon filament lamp, in which case the device 30 and the current limiting resistor 14 would be interchanged. In the arrangement described above the frequency of the periodic current is determined primarily by the saturating time of the reactor 13 and the time required for the device 30 to effect its maximum change in resistance which is, in fact, usually determined by its heating characteristics. With this arrangement the output circuit including the reactor 25 may be used for blinking signal lights or this reactor 25 may be replaced by a pair of reactors to control the alternate lighting of a pair of lamps as illustrated in Fig. 1.

While I have shown and described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric circuit including a source of current and an electric valve, a second circuit including an impedance proportioned to be saturated by the current flowing in said first circuit, and means for controlling the conductivity of said valve in response to the saturation of said impedance.

2. Apparatus for generating relatively low frequency unidirectional current impulses comprising an alternating current source, an electric valve provided with an anode, a cathode, and a control element, saturating means having a saturating winding in the anode circuit of said valve, and means for impressing upon said control element a potential dependent upon the impedance of said saturating means.

3. Apparatus for generating relatively low frequency unidirectional current impulses comprising an alternating current source, an electric valve provided with an anode, a cathode, and a control grid, a saturating reactor provided with a saturating winding connected serially with said valve across a source of alternating current, means for impressing upon said control element a potential dependent upon the impedance of said reactor, and a load circuit associated with the anode circuit of said valve.

4. Apparatus for generating relatively low frequency unidirectional current impulses, comprising an alternating current source, an electric valve provided with an anode, a cathode, and a control element, a saturating reactor having a saturating winding in the anode circuit of said valve, means for rendering said valve conducting, means responsive to the saturation of said reactor to render said valve non-conducting, and load circuit associated with the anode circuit of said valve.

5. Apparatus for converting alternating current into relatively lower frequency unidirectional current impulses, comprising a vapor electric valve provided with an anode, a cathode, and a control grid, a saturating reactor having a saturating winding in the anode circuit of said valve, a circuit connected between said grid and said cathode including a source of constant alternating potential, and a second source of alternating potential of opposite polarity from said first source and variable in magnitude in response to variations in the saturation of said reactor, and load circuit associated with the anode circuit of said valve.

6. Apparatus for converting alternating current into relatively lower frequency unidirectional current impulses, comprising a vapor electric valve provided with an anode, a cathode, and a control grid, a saturating reactor having a saturating winding in the anode circuit of said valve, a circuit connected between said grid and said cathode including a source of constant alternating potential normally to render said valve conducting, and a second source of alternating potential, variable in magnitude in accordance with variations in the saturation of said reactor to render said valve non-conducting upon a predetermined saturation of said reactor, and a load circuit associated with the anode circuit of said valve.

7. Apparatus for converting alternating current into relatively lower frequency unidirectional current impulses, comprising a source of alternating current, a vapor electric valve provided with an anode, a cathode and a control grid, a saturating reactor provided with a saturating winding connected across said source through said valve and a main winding also energized from said source, a grid circuit for said valve, a transformer having one winding included in said grid circuit and another winding connected across said source, and a source of potential dependent upon the current flowing in said main reactor winding, and a load circuit connected with the anode circuit of said valve.

8. In combination an electric circuit including a source of current and an electric valve, a second circuit including a device the resistance of which varies in accordance with the current flowing therein and an impedance adapted to be saturated in response to current flowing in said first circuit, and means for controlling the conductivity of said valve in response to the saturation of said impedance and the resistance of said device.

9. In combination an electric circuit including a source of current and an electric valve, a second circuit including a device the resistance of which varies in accordance with the current therein, said device being energized in accordance with the current flowing in said first circuit and means for controlling the conductivity of said valve in response to the resistance of said device.

10. In combination an electric circuit including a source of current and an electric valve, a second circuit including a device the resistance of which varies in accordance with the current flowing therein with a time delay between the current variation and the resistance variation, said device being energized in accordance with the current flowing in said first circuit and means for controlling the conductivity of said valve in response to the resistance of said device.

11. In combination an electric circuit including a source of current and an electric valve, a second circuit including a device having a positive resistance current characteristic and an impedance adapted to be saturated in response to current flowing in said first circuit, and means for controlling the conductivity of said valve in response to the saturation of said impedance and the resistance of said device.

CHAUNCEY G. SUITS.